(12) United States Patent
Morscheck et al.

(10) Patent No.: US 7,335,123 B2
(45) Date of Patent: Feb. 26, 2008

(54) HYBRID POWERTRAIN SYSTEM AND TRANSFORMER MODULE

(75) Inventors: Timothy J. Morscheck, Portage, MI (US); Kevin D. Beaty, Kalamazoo, MI (US)

(73) Assignee: Eaton Corporation, Cleveland, OH (US)

( * ) Notice: Subject to any disclaimer, the term of this patent is extended or adjusted under 35 U.S.C. 154(b) by 264 days.

(21) Appl. No.: 10/987,403

(22) Filed: Nov. 12, 2004

(65) Prior Publication Data

US 2006/0105875 A1    May 18, 2006

(51) Int. Cl.
    *F16H 3/72*    (2006.01)
(52) U.S. Cl. .......................................... 475/5
(58) Field of Classification Search ............... 475/5, 475/311, 323, 330, 343, 903, 72, 83; 477/3
    See application file for complete search history.

(56) References Cited

U.S. PATENT DOCUMENTS

| | | | |
|---|---|---|---|
| 4,259,881 A * | 4/1981 | Meyerle ...................... | 475/72 |
| 5,222,921 A * | 6/1993 | Garcia ......................... | 475/72 |
| 5,637,987 A | 6/1997 | Fattic et al. | |
| 5,713,814 A | 2/1998 | Hara et al. | |
| 5,803,856 A * | 9/1998 | Iino et al. ..................... | 475/72 |
| 6,176,808 B1 | 1/2001 | Brown et al. | |
| 6,203,463 B1 * | 3/2001 | Casey et al. .................. | 475/72 |
| 6,251,037 B1 * | 6/2001 | Baumgaertner et al. ....... | 475/2 |
| 6,371,878 B1 * | 4/2002 | Bowen ......................... | 475/5 |
| 6,478,705 B1 * | 11/2002 | Holmes et al. ................ | 475/5 |
| 6,551,208 B1 * | 4/2003 | Holmes et al. ................ | 475/5 |
| 6,994,646 B2 * | 2/2006 | Ai ................................ | 475/5 |
| 7,001,296 B2 * | 2/2006 | Yamauchi et al. ............. | 475/5 |
| 2003/0008745 A1 * | 1/2003 | Heindl ......................... | 475/83 |
| 2005/0124449 A1 * | 6/2005 | Moeller ........................ | 475/5 |

* cited by examiner

*Primary Examiner*—Roger Pang
(74) *Attorney, Agent, or Firm*—Rader, Fishman & Grauer PLLC

(57) ABSTRACT

A powertrain system is provided that includes a first prime mover, a second prime mover and a transformer module. In an embodiment, the transformer module includes a planetary gearset having a first rotary element connected to the first prime mover, a second rotary element connected to the second prime mover, and a third rotary element comprising an output member of the transformer module. The powertrain system also includes a power shunt between the first prime mover and the second prime mover.

14 Claims, 10 Drawing Sheets

US 7,335,123 B2

HYBRID POWERTRAIN SYSTEM AND TRANSFORMER MODULE

BACKGROUND OF THE INVENTION

1. Field of the Invention

The present invention relates to a powertrain system and, more particularly, to a hybrid powertrain system including a transformer module having a planetary gearset.

2. Description of the Related Art

Hydrokinetic torque converters are commonly used in engine-driven vehicles and other equipment applications where a speed absorbing function (i.e., varying the output speed of the torque converter relative to the input speed) and a torque amplification function are desired. In automated vehicle powertrain systems, for example, it is common to position a torque converter between an engine and an automatic transmission. While hydrokinetic torque converters satisfactorily perform the torque amplification function, they are relatively inefficient at performing the speed absorbing function. For this and other reasons, a powertrain apparatus is needed that performs a speed absorbing function more efficiently than a hydrokinetic torque converter without limiting its ability to transfer torque.

SUMMARY OF THE INVENTION

A powertrain system is provided that includes a first prime mover, a second prime mover and a transformer module. In an embodiment, the transformer module includes a planetary gearset having a first rotary element connected to the first prime mover, a second rotary element connected to the second prime mover, and a third rotary element comprising an output member of the transformer module. At least one of the first and second rotary elements drive rotation of the third rotary element. The powertrain system also includes a power shunt between the first prime mover and the second prime mover. A transformer module for use in a dual prime mover powertrain system is also provided.

BRIEF DESCRIPTION OF THE DRAWINGS

Embodiments of the invention will now be described, by way of example, with reference to the accompanying drawings, wherein.

DETAILED DESCRIPTION OF THE INVENTION

Figure 1:
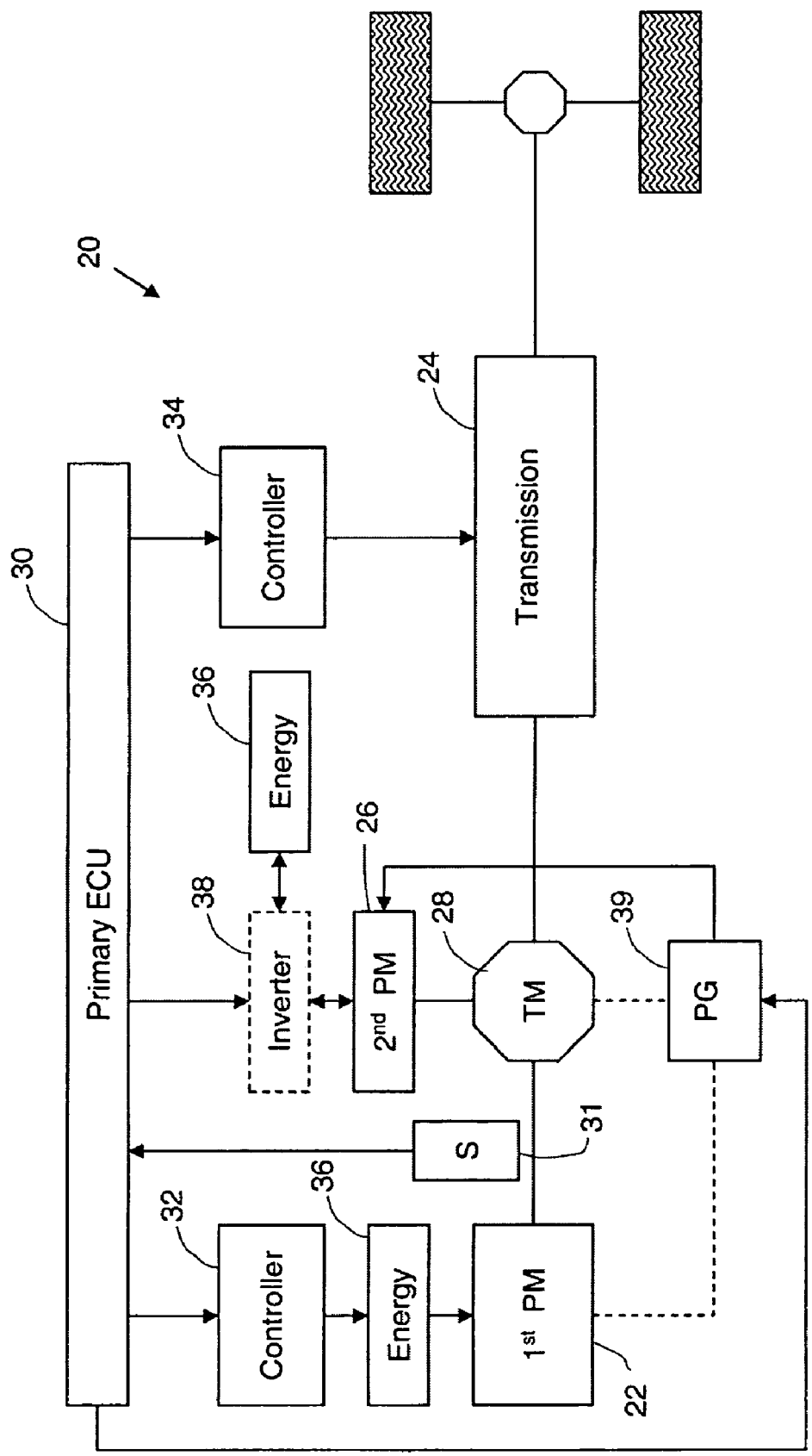
FIG. 1 is a block diagram showing a vehicle powertrain system according to an embodiment of the present invention.

FIG. 1 is a block diagram showing a vehicle powertrain system 20 according to an embodiment of the present invention. In the illustrated embodiment, powertrain system 20 includes a first prime mover 22, such as a spark-ignited or compression-ignited internal combustion engine, a transmission 24 and a second prime mover 26, such as an electric motor-generator or hydraulic motor-pump. A powertrain transformer module 28 is positioned between first prime mover 22 and transmission 24 to transfer rotational power from first prime mover 22 and second prime mover 26 to transmission 24.

In an embodiment, powertrain system 20 also includes an electronic control unit (ECU) 30 for controlling operation of first prime mover 22, second prime mover 26 and transmission 24. In an implementation of the invention, ECU 30 includes a programmable digital computer that is configured to receive various input signals, including without limitation, the operating speeds of first and second prime movers 22 and 26, transmission input speed, selected transmission ratio, transmission output speed and vehicle speed. ECU 30 processes these signals accordingly to logic rules to control operation of powertrain system 20. For example, powertrain system 20 may include a sensor 31 for measuring engine speed; the output of sensor 31 being used by ECU 30 to control the speed of first prime mover 22 and/or second prime mover 26. To support this control, each of first prime mover 22 and transmission 24 may include its own controllers 32 and 34, respectively, controlled by the primary ECU 30. However, it will be appreciated that the present invention is not limited to any particular type or configuration of ECU 30 and controllers 32 and 34, or to any specific control logic for governing operation of powertrain system 20.

Powertrain system 20 also includes at least one energy storage device 36 for providing energy to operate first and second prime movers 22, 26. For example, energy storage device 36 may contain a hydrocarbon fuel when first prime mover 22 functions as an internal combustion engine. In another example, energy storage device 36 may include a hydraulic accumulator when second prime mover 26 functions as a hydraulic motor-pump. Alternatively, energy storage device 36 may include a battery, a bank of batteries or a capacitor when second prime mover 26 functions as an electric motor-generator. When so configured, the electric motor-generator may be provided in electrical communication with electrical storage device 36 through a drive inverter 38, as is known in the art.

In the illustrated embodiment, powertrain system 20 also includes a power generating device 39 driven by first prime mover 22 either directly or indirectly through transformer module 28. In a particular configuration, power generating device 39 includes an electrical generator for supplying electrical energy to a second prime mover 22 when second prime mover 22 functions as an electric motor. In another configuration, power generating device 39 includes a hydraulic pump for supply fluid power to a second prime mover 26 when second prime mover 26 functions as a hydraulic motor.

Figure 2:
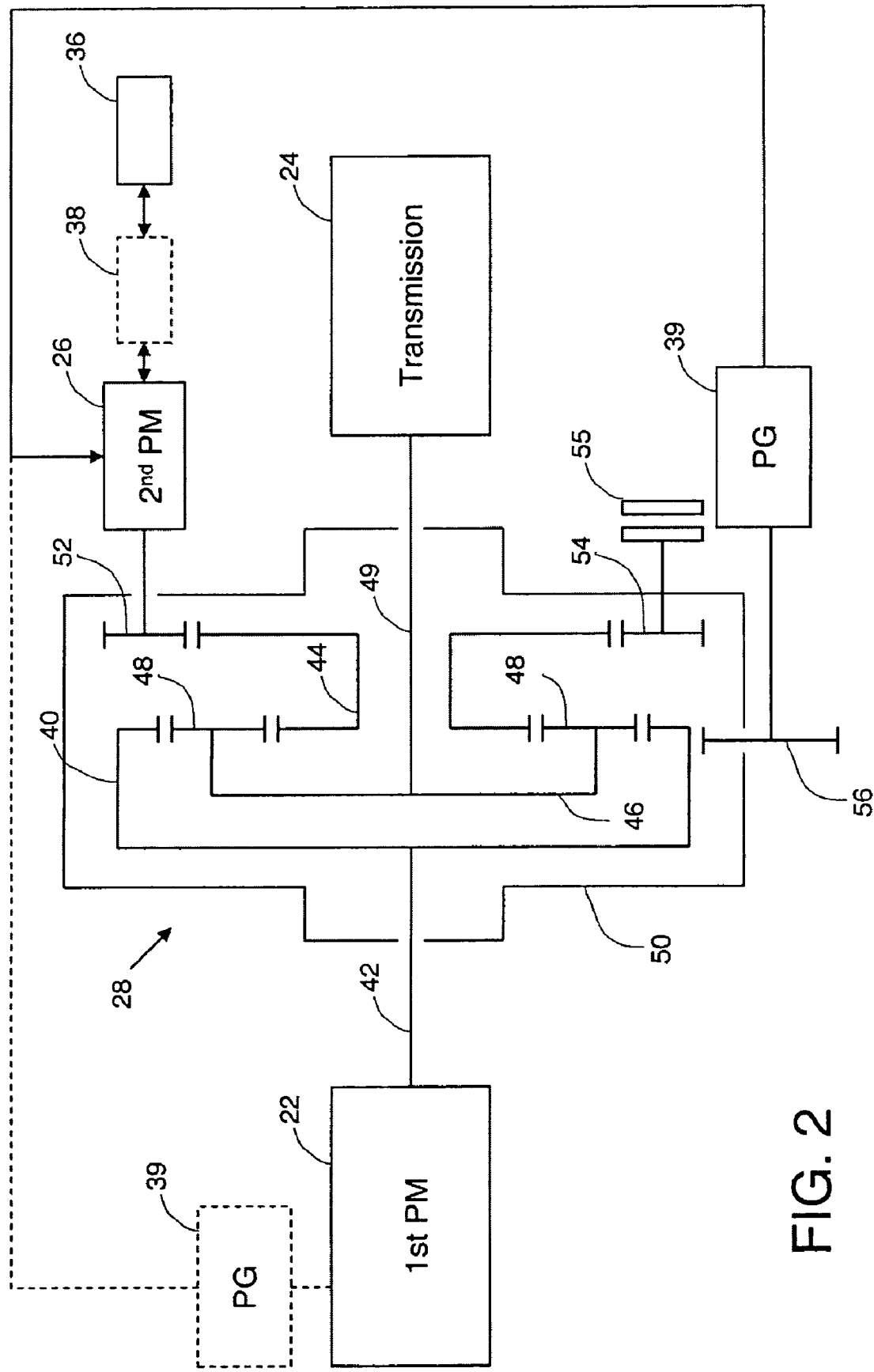
FIG. 2 is a schematic diagram showing a powertrain transformer module according to an embodiment of the invention.
Figure 3:
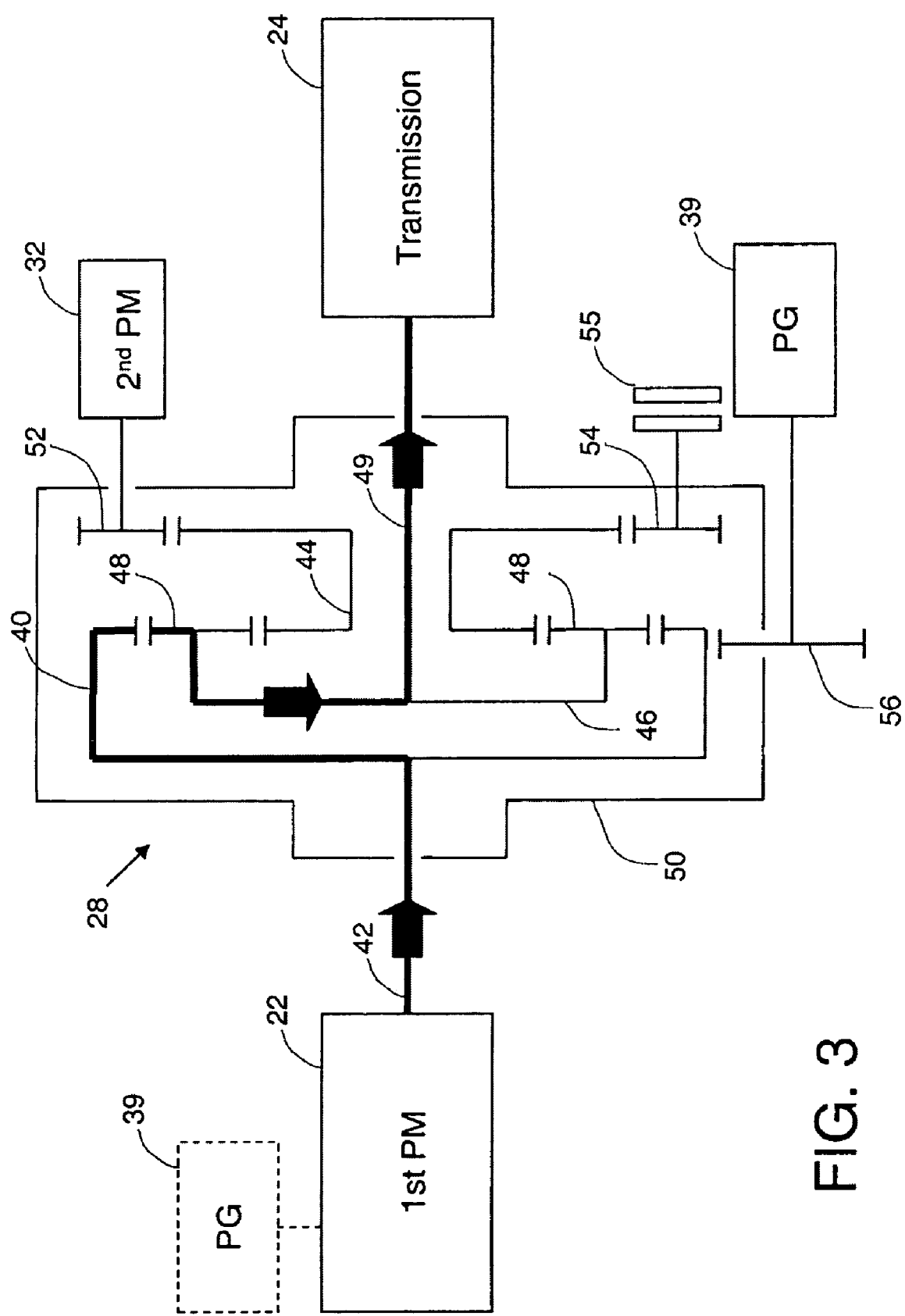
FIG. 3 is a schematic diagram of the powertrain transformer module of FIG. 2 illustrating a power path through the transformer module when the first prime mover is operating and the second prime mover is idle.

Referring to FIG. 2, an embodiment of powertrain transformer module 28 is shown. In the illustrated embodiment, transformer module 28 includes a planetary gearset having at least three rotary elements. More particularly, the planetary gearset includes a first rotary element, or ring gear 40, connected to an output shaft 42 of first prime mover 22. A second rotary element, or sun gear 44, acts as a reaction against the first rotary element 40 and is connected to second prime mover 26. The direction of rotation of second rotary element 44 may be opposite that of first rotary element 40 under some circumstances. A third rotary element, or carrier 46, is connected to an input shaft 49 of transmission 24 and supports a plurality of pinion gears 48. The planetary gearset is enclosed within a housing 50.

In an embodiment, second prime mover 26 is connected to a planetary gear 52 that meshes with second rotary element 44. Transformer module 28 may include additional planetary gears 54 that are not connected to second prime mover 26. Optionally, one or more of planetary gears 54 may be connected to or include a friction clutch 55 to selectively inhibit rotation of planetary gears 52 and 54 and indirectly control rotation of second rotary element 44.

In an embodiment, power generating device 39 also includes a gear 56 that is driven by first rotary element 40. Because first rotary element 40 rotates when first prime mover 22 is operating, power generating device 39 is capable of supplying power to second prime mover 26 when first prime mover 22 is operating. In another embodiment, power generating device 39 may be driven directly by first prime mover 22 (as shown in phantom in FIG. 2). For example, when first prime mover 22 functions as an engine, power generating device 39 may comprise a belt-driven engine accessory similar to an alternator or a power steering pump.

Operation of powertrain system 20 will now be described with reference to FIGS. 3-10. In a first mode of operation shown in FIG. 3, only the power generated by first prime mover 22 is used to drive rotation of third rotary element 46 (the power path is shown in bold and the power flow is highlighted by directional arrows). The power is first applied to first rotary member 40, the rotation of which causes pinion gears 48 to orbit about second rotary member 44. The orbiting pinion gears 48 cause third rotary member 46 to rotate in the same direction as first rotary member, albeit at a reduced speed, which in turn drives rotation of input shaft 49. In this mode of operation, second prime mover is idle and, optionally, one or more of planetary gears 54 are clutched to prevent rotation of second rotary member 44.

Figure 4:
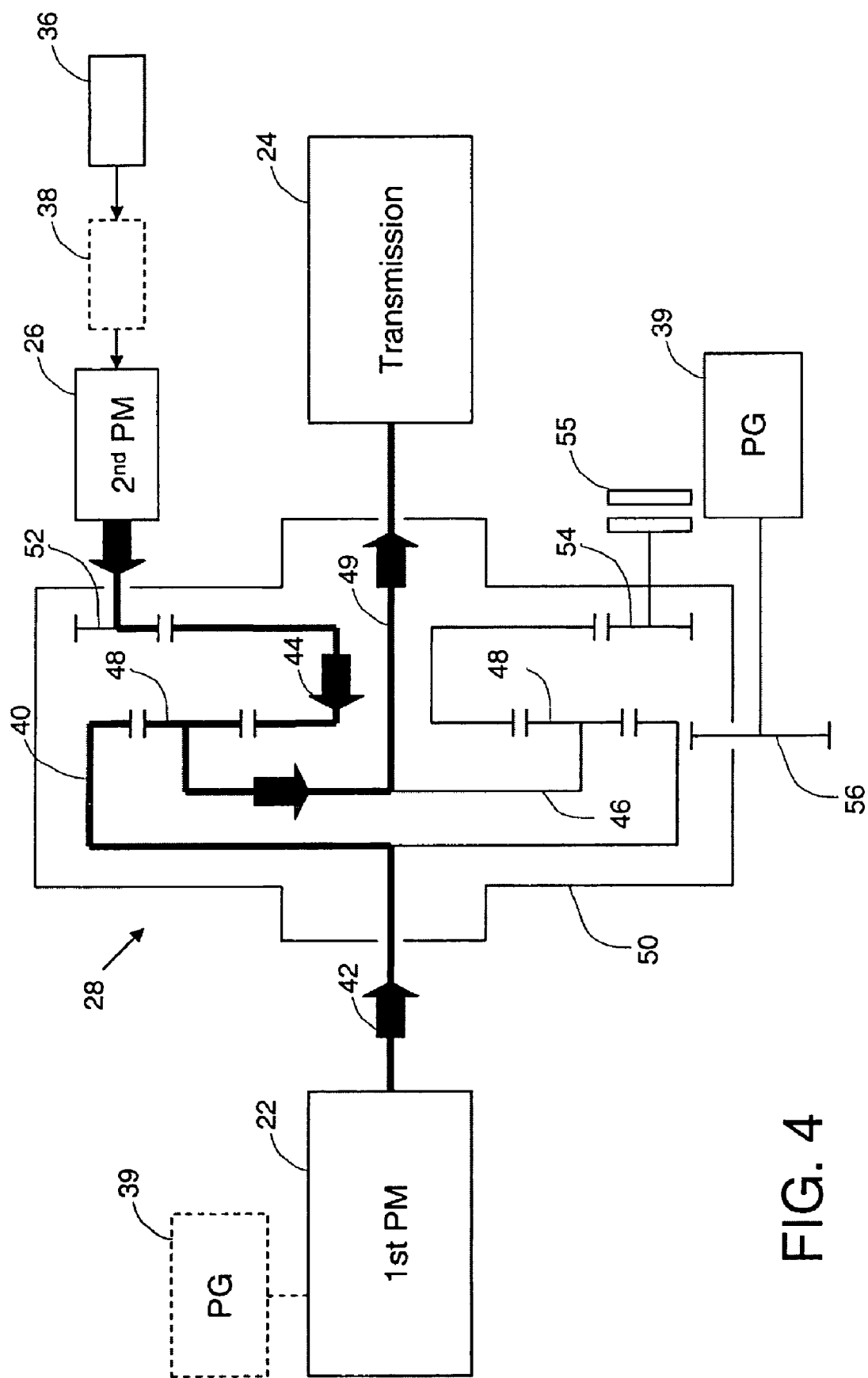
FIG. 4 is a schematic diagram of the powertrain transformer module of FIG. 2 illustrating a power path through the transformer module when both the first and second prime movers are operating.

In another mode of operation shown in FIG. 4, the power provided by first prime mover 22 is supplemented with power provided by second prime mover 26. The power supplied by second prime mover 26 drives rotation of planetary gear 52, which in turn drives rotation of second rotary element 44. Thus, in this mode of operation, the output torque of first and second prime movers 22, 26 is blended at pinion gears 48 and then distributed through third rotary element 46 to input shaft 49. In the embodiment of FIG. 4, the energy to operate second prime mover 26 is provided by energy storage device 36. When second prime mover includes an electric motor, energy storage device 36 may include, for example, a battery, batteries or other source of electric power. Alternatively, when second prime mover includes a hydraulic motor, energy storage device may include a hydraulic accumulator or other source of fluid power.

Figure 5:
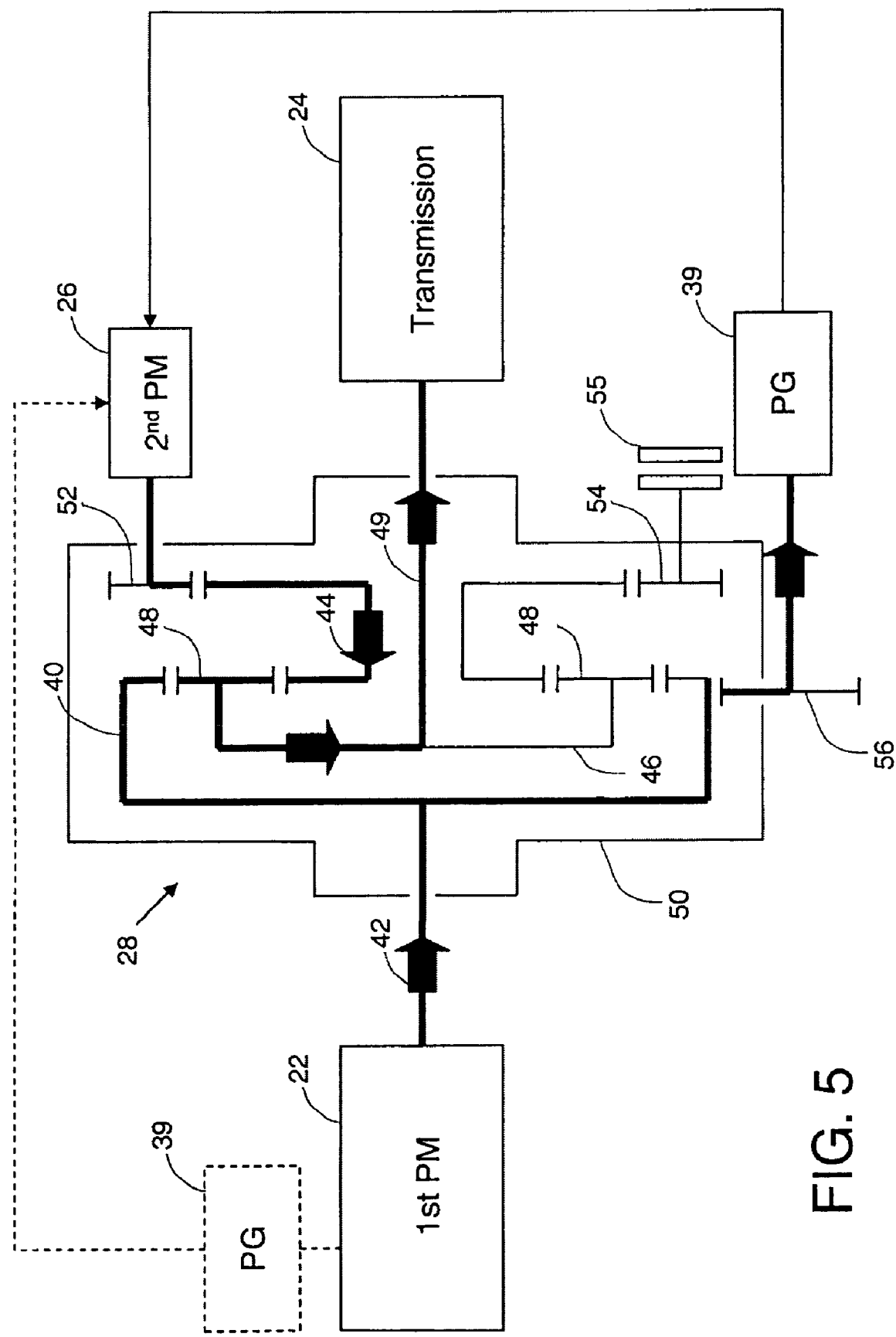
FIG. 5 is a schematic diagram of the powertrain transformer module of FIG. 2 illustrating another power path through the transformer module when both the first and second prime movers are operating.
Figure 6:
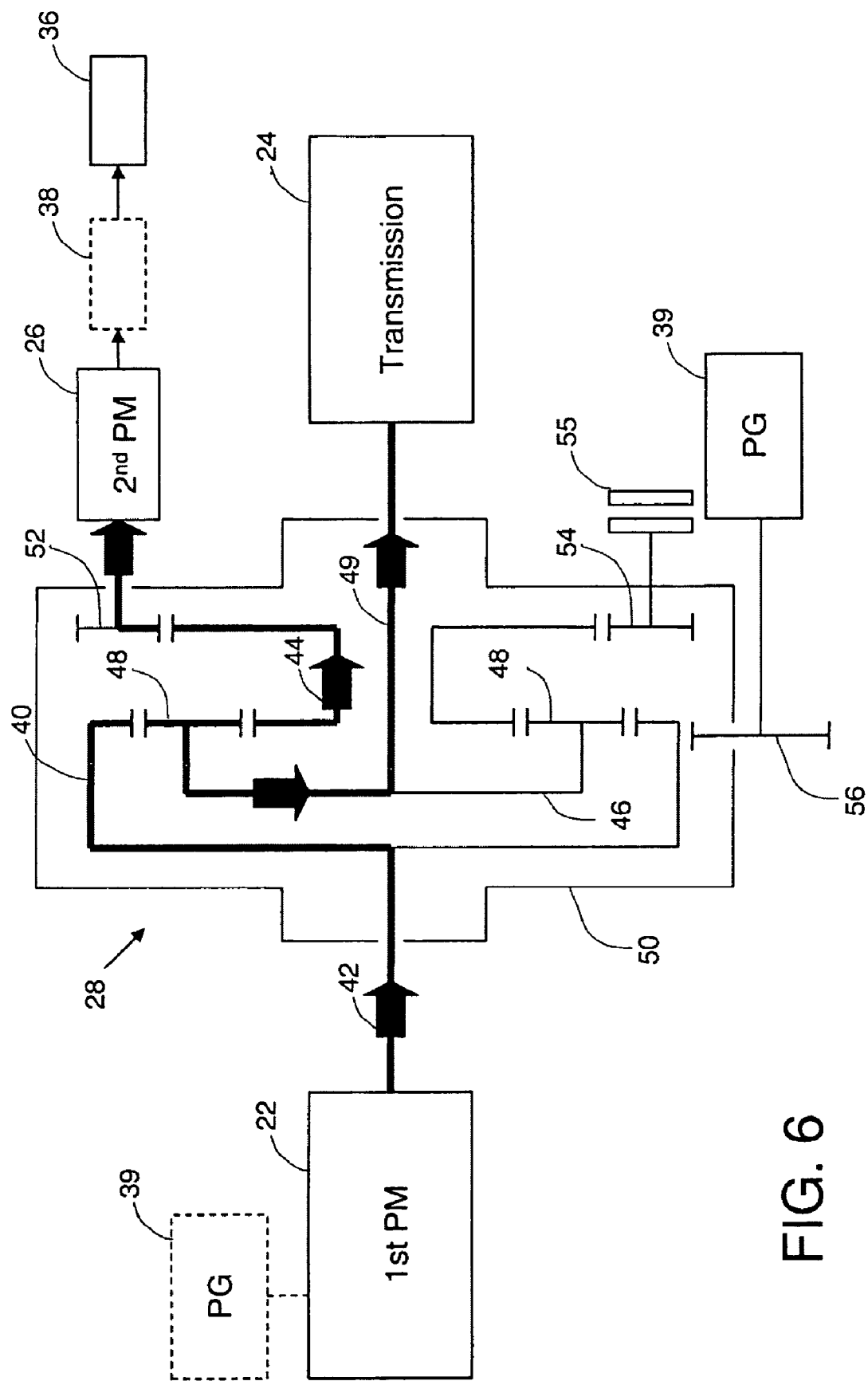
FIG. 6 is a schematic diagram of the powertrain transformer module of FIG. 2 illustrating a power path through the transformer module when the first and prime mover is supplying power to both the second prime mover and a transmission.

Another mode of operation of powertrain system 20 is shown in FIG. 5. This mode of operation is substantially similar to the mode of operation shown in FIG. 4 with at least one exception, namely, the power to rotate second rotary element 44 is provided by a power shunt between first prime mover 22 and second prime mover 26. In the embodiment shown in FIG. 5, the power shunt is created by connecting power generating device 39 to first rotary device 40 and operating first prime mover 22 to drive rotation of first rotary element 40 and gear 56. Thus, power generating device 39 generates and supplies power to second prime mover 26 provided first prime mover 22 is operating.

In steady-state operation, second prime mover 26 may be operated to continuously supplement the power provided by first prime mover 22. Accordingly, transformer module may be operated to continuously vary the speed ratio between output shaft 42 and input shaft 49. In powertrain system 20, precise closed-loop speed control can be accomplished by monitoring engine speed (e.g., using sensor 31) and adjusting the output speed of transformer module 28 through controlled operation of transmission 24 and/or second prime mover 26. ECU 30 may include control logic that provides steady-state set-point speed control of input shaft 49 or "programmable" speed control of input shaft 49 depending on one or more operating conditions of the vehicle.

When first prime mover is an internal combustion engine, supplementing the power of the internal combustion engine with power provided by second prime mover 26 allows the operating efficiency of the engine to be optimized. As will be appreciated, supplementing engine power with the power of second prime mover 26 allows the engine to be operated along its "S-curve", which, as is known in the art, provides the best tradeoff between fuel efficiency and exhaust emissions.

Another feature of the present invention is that first prime mover 22 may be used to drive second prime mover 26 as an electric generator or hydraulic pump to recharge energy storage device 36. In a representative mode of operation shown in FIG. 6, first prime mover 22 provides power to rotate input shaft 49 as discussed above in reference to FIG. 3. However, a portion of the power applied to pinion gears 48 is transmitted through to second rotary element 44 to drive rotation of second rotary element 44 and planetary gears 52, 54. Thus, power from first prime mover 22 can be transmitted to second prime mover 26. This feature is particularly useful when second prime mover 26 is operating as generator or pump to regenerate energy storage device 36.

Figure 7:
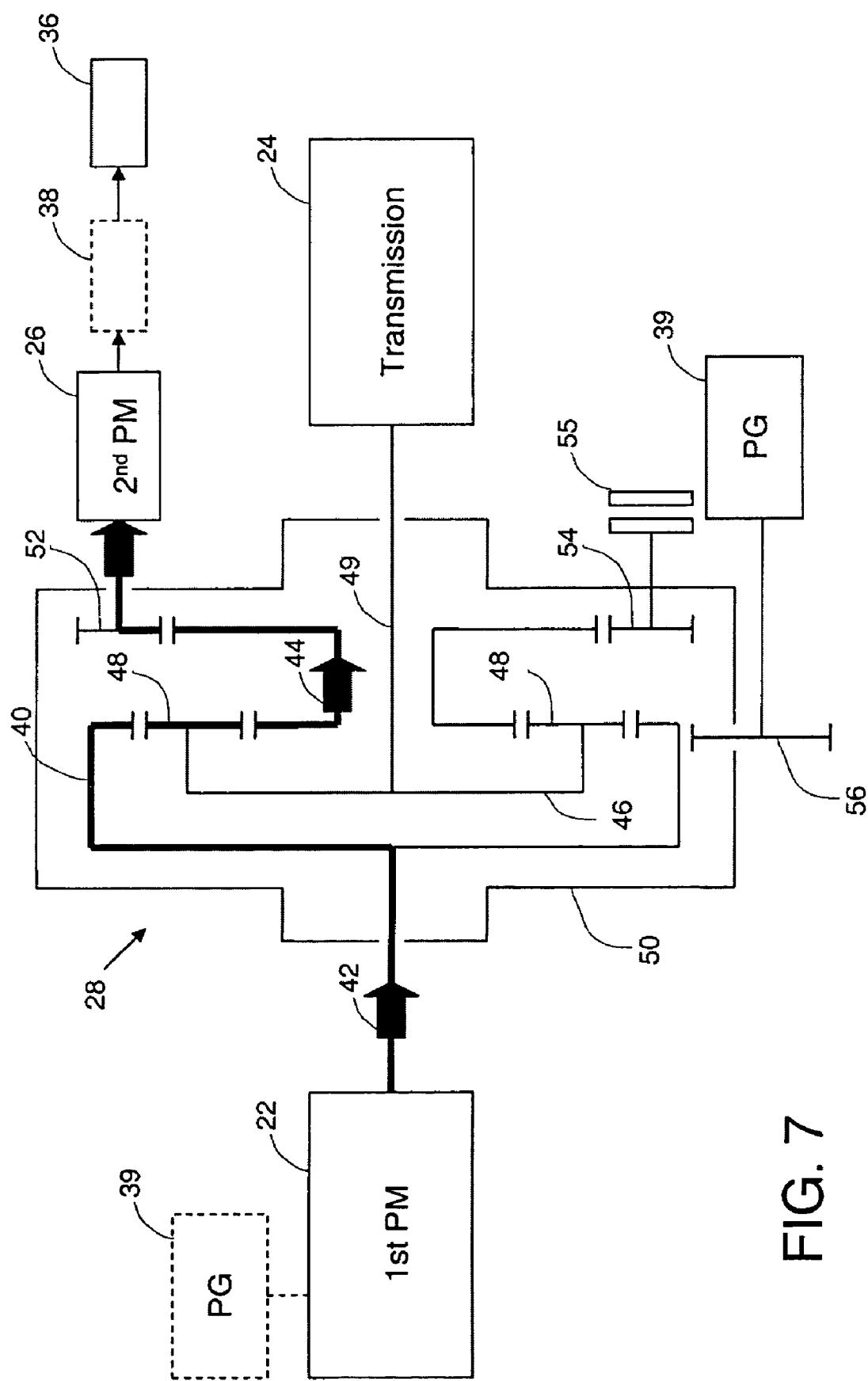
FIG. 7 is a schematic diagram of the powertrain transformer module of FIG. 2 illustrating a power path through the transformer module when the first prime mover is supplying power to the second prime mover.
Figure 8:
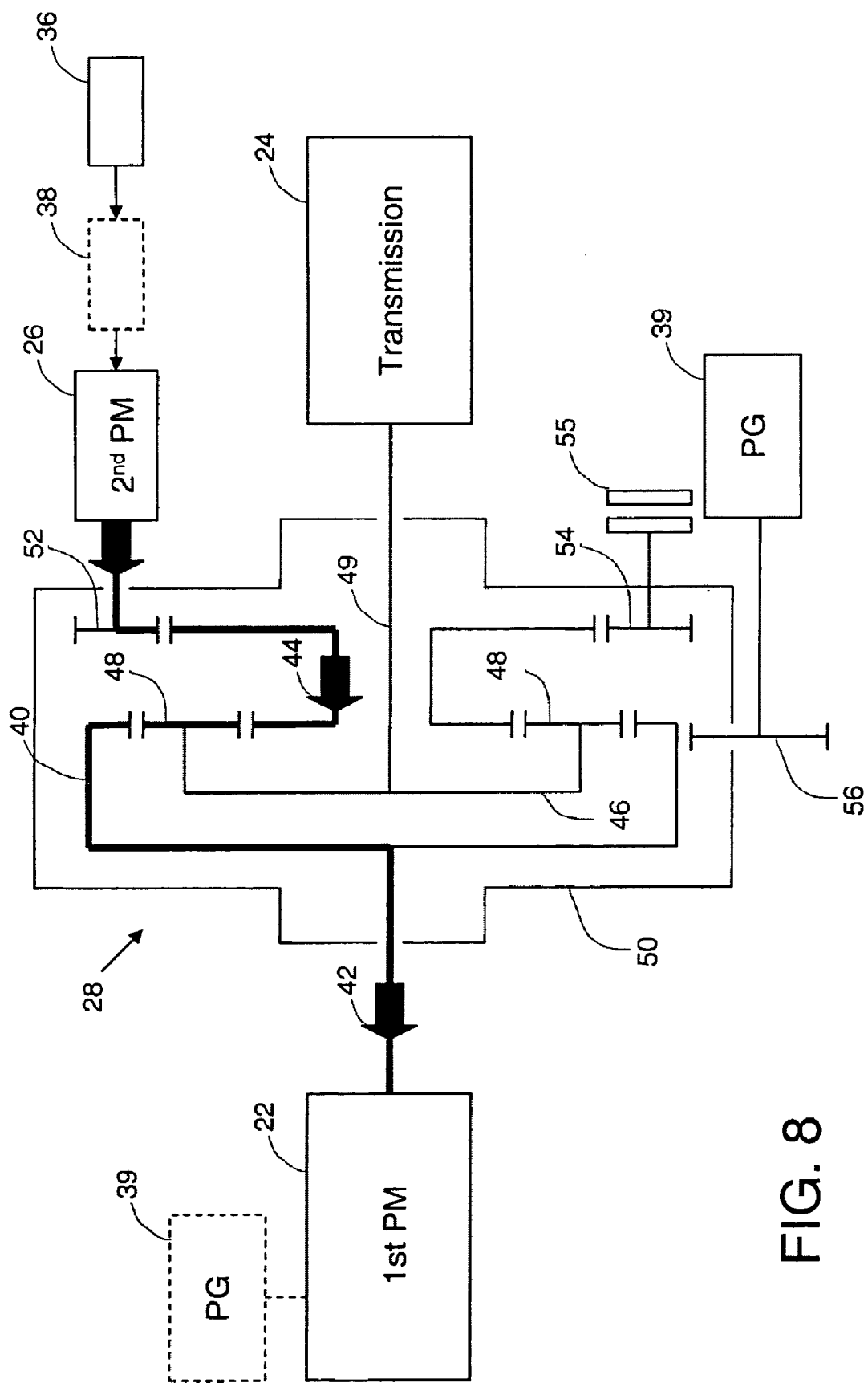
FIG. 8 is a schematic diagram of the powertrain transformer module of FIG. 2 illustrating a power path through the transformer module when the second prime mover is supplying power to the first prime mover.
Figure 9:
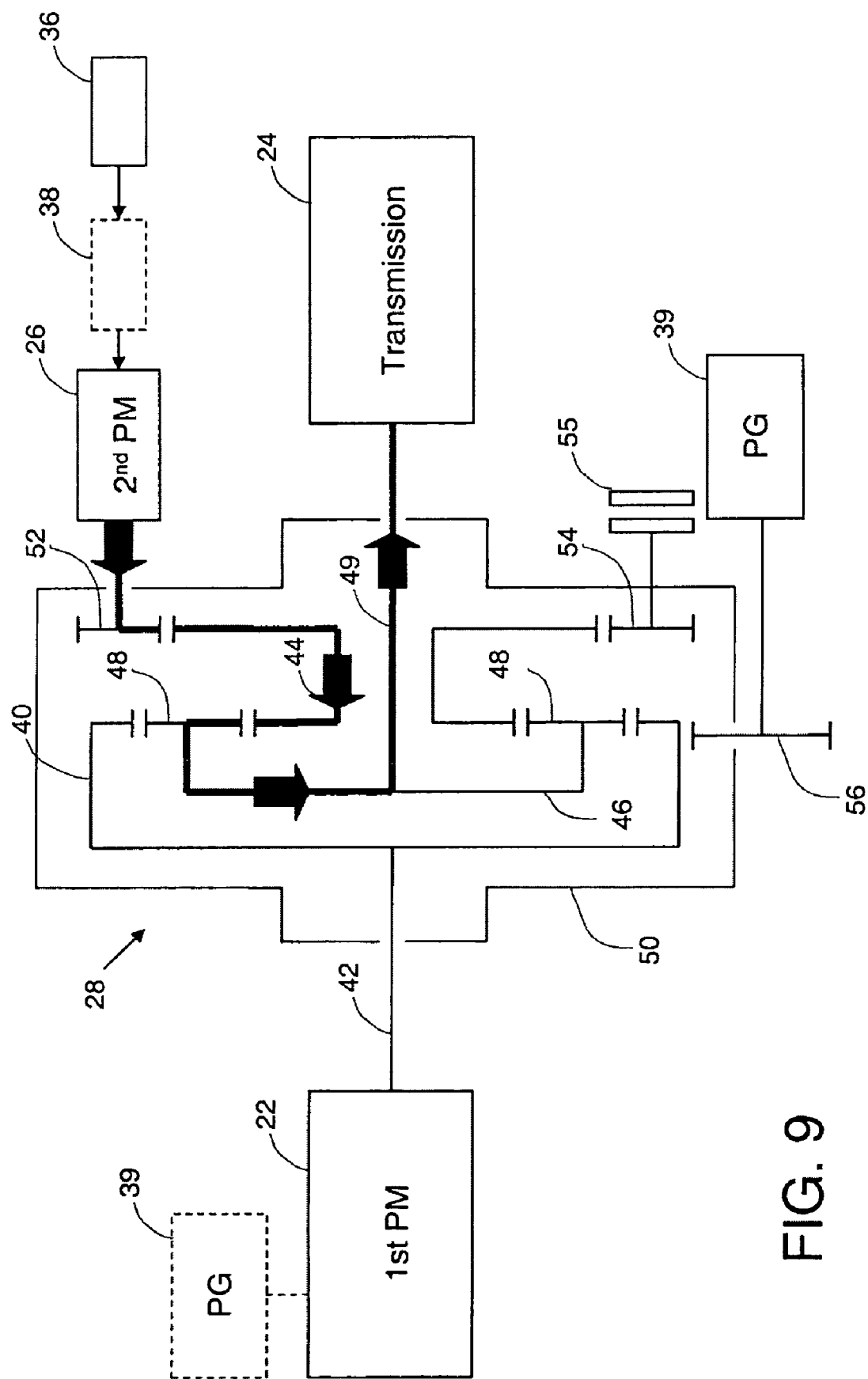
FIG. 9 is a schematic diagram of the powertrain transformer module of FIG. 2 illustrating a power path through the transformer module when the second prime mover is supplying power to a transmission and the first prime mover is idle.
Figure 10:
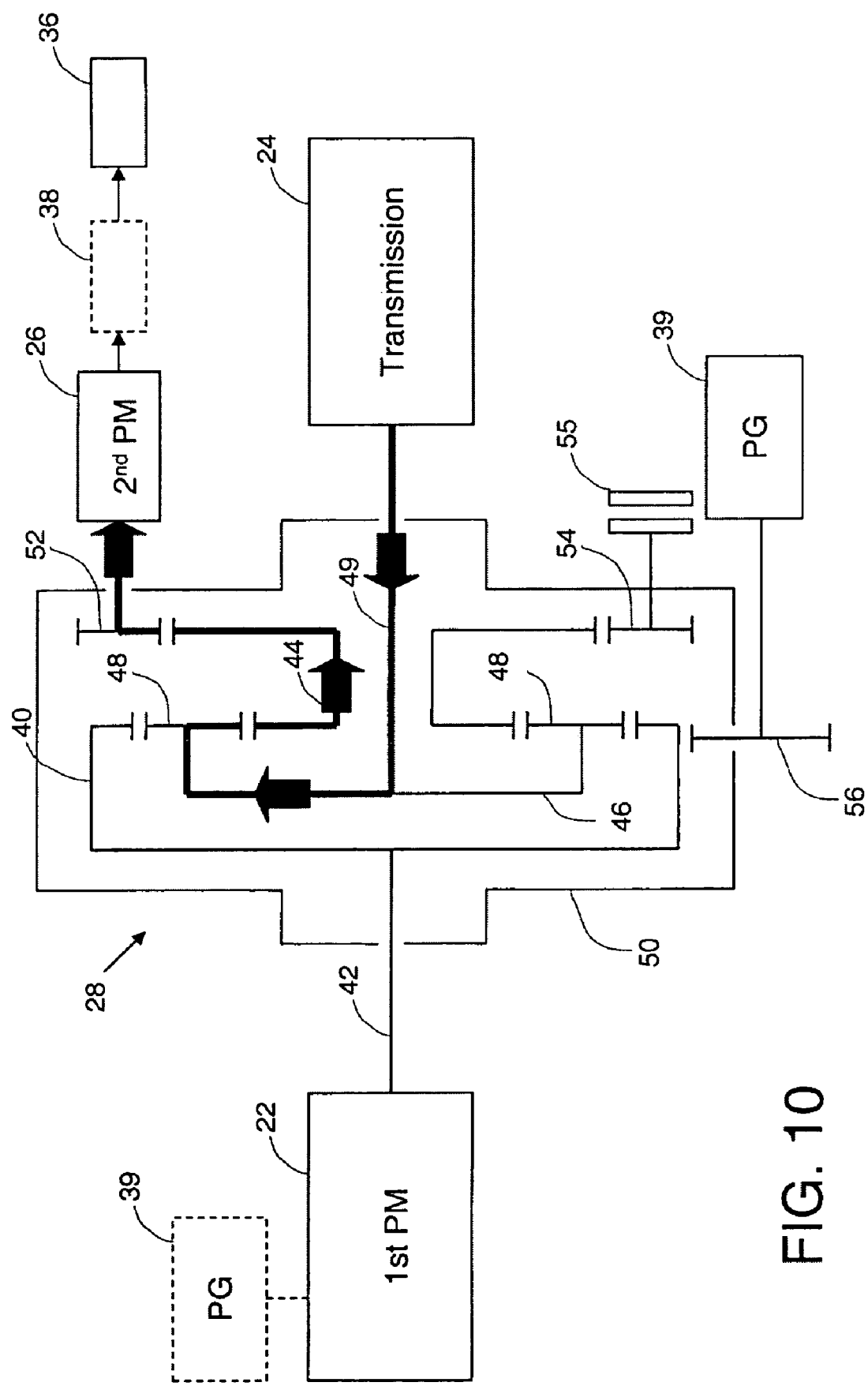
FIG. 10 is a schematic diagram of the powertrain transformer module of FIG. 2 illustrating a power path through the transformer module during regenerative braking of a vehicle employing the transformer module.

Referring to FIG. 7, another mode of operation of powertrain system 20 is shown in which input shaft 49 is idle and the power from first prime mover 22 is transmitted from first rotary member 40 to second rotary member 44 through pinion gears 48 and then into planetary gears 52, 54. When second prime mover 26 includes an electric generator, first prime mover 22 may be used to drive second prime mover 26 to supply electric power for on-board or off-board electrical equipment via drive inverter 38. Similarly, when second prime mover 26 functions as a hydraulic pump, first prime mover 22 may be used to drive second prime mover 26 to provide fluid power for on-board or off-board hydraulic equipment. Since this mode of operation permits second prime mover 26 to be operated while input shaft 49 is idle, a vehicle employing powertrain system 20 does not need to be moving for power generation to occur.

When first prime mover 22 functions as an engine, the engine may be started by operating second prime mover 26 as a "starter". In a representative mode of operation shown in FIG. 8, second prime mover is operated to drive rotation of second rotary element 44 via planetary gear 52 while input shaft 49 and third rotary element 46 are idle. The rotation of second rotary element 44 causes rotation of pinion gears 48 and first rotary element 40 such that torque is transmitted to first prime mover 22 to start the engine. In a vehicle, this mode of operation is analogous to starting the engine while the vehicle is at rest.

Alternatively, torque may also be transmitted from second rotary element 44 into first rotary element 40 while third rotary element 46 is rotating. In a vehicle, this mode of operation is analogous to launching the vehicle using the power of second prime mover 26 alone to rotate input shaft 49 (see, e.g., FIG. 9) and then starting the engine after the vehicle has been launched. Once started, the vehicle can be driven forward under the power of first prime mover 22, second prime mover 26 or a combination of both.

During vehicle braking, second prime mover 26 may be back-driven by transmission input shaft 49 as an electric generator or a hydraulic pump to recharge energy storage device 36. Known as "regenerative braking," this braking complements conventional friction braking to reduce the speed of the vehicle. In a mode of operation shown in FIG. 10, power it routed from the vehicle wheels, through transmission 24 and into input shaft 49 to drive rotation of third rotary member 46. This power is then transmitted to second rotary element 44 via pinion gears 48 and then into second prime mover 26 through planetary gear 52. During regenerative braking, ECU 30 selectively controls operation of first prime mover 22, second prime mover 26 and transmission 24 for appropriate energy recapture. When operating as an electric generator, second prime mover 26 may be used to recharge a battery, batteries or other electrical storage device. When operating as a hydraulic pump, second prime mover 26 may be used to recharge a hydraulic accumulator or other fluid power storage device.

From the above description it should now be apparent that powertrain system 20, particularly transformer module 28, includes a number of features not found in hydrokinetic torque converters. Among other features, transformer module 28 is inherently more efficient than a hydrokinetic torque converter because it utilizes the power transferring efficiency of gears rather than fluid power. Additionally, when employed in a vehicle powertrain, transformer module 28 permits an internal combustion engine to operate along its "S-curve", which, as is known in the art, provides the best tradeoff between fuel efficiency and exhaust emissions. This operation may be facilitated by providing a power shunt between the first prime mover 22 and the second prime mover 26 to satisfy the relatively high power demand associated with continuous or near continuous operation of second prime mover 26.

When powertrain system 20 is employed in a vehicle where the first prime mover is an internal combustion engine, second prime mover 26 may also be used to supplement the torque provided by first prime mover 22 during vehicle acceleration. As a result, the fuel economy is improved through downsizing of the engine relative to the size required for vehicle launch and acceleration using the engine alone. Yet another feature is that second prime mover 26 alone may be used to drive rotation of transmission input shaft 49, thereby reducing the extent to which first prime mover 22 is operated.

Another feature is that second prime mover 26 may be operated as a motor to start first prime mover 22 (when first prime mover 22 functions as an engine), thus reducing the mass and space needed for a conventional starter motor. Additionally, when operating as an electric generator or hydraulic pump, second prime mover 26 may be selectively operated to recover electrical or hydraulic energy during vehicle braking, to enhance fuel economy. Another feature is that energy storage device 36 may be recharged while the vehicle is at rest or while the vehicle is moving. Still another feature is that second prime mover 26 may be operated as an electric generator or hydraulic pump to power on-board or off-board electric or hydraulic devices, while the vehicle is either at rest or moving.

While transformer module 28 is particularly suited for use in the powertrain systems of "on-highway" vehicles, transformer module 28 may also be used in "off-highway" vehicles, such as agricultural and construction equipment. Additionally, transformer module 28 may be employed in non-vehicle applications, such as in power generation equipment.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A powertrain system, comprising:
    a first prime mover;
    a second prime mover;
    a transformer module that includes a planetary gearset having a first rotary element connected to the first prime mover, a second rotary element connected to the second prime mover, and a third rotary element comprising an output member of the transformer module;
    at least one gear meshed with the second rotary element, the second prime mover connected to the second rotary element through the gear;
    a clutch for selectively inhibiting rotation of the second rotary element; and
    a power shunt between the first prime mover and the second prime mover, wherein the power that is transmitted through the power shunt between the first prime mover to the second prime mover is not transmitted through planet gear teeth of the planetary gearset while transmitted through the shunt, and wherein the first rotary element is a ring gear of the planetary gearset.

2. The vehicle powertrain system of claim 1, wherein the power shunt includes a power generating device driven by the first prime mover and configured to provide power to the second prime mover during operation of the first prime mover.

3. The vehicle powertrain system of claim 2, wherein the power generating device is connected to the first rotary element and driven by the first prime mover through the first rotary element.

4. The vehicle powertrain system of claim 2, wherein the power generating device is an electrical generator and the second prime mover is an electric motor.

5. The vehicle powertrain system of claim 2, wherein the power generating device is a hydraulic pump and the second prime mover is a hydraulic motor.

6. The vehicle powertrain system of claim 1, wherein the second rotary element is a sun gear and the third rotary element is a carrier that includes a number of pinion gears meshed with the ring gear and the sun gear.

7. The vehicle powertrain system of claim 1, further including a control unit configured to operate the second prime mover to continuously vary the rotational speed of the output member.

8. The vehicle powertrain system of claim 1, wherein the first prime mover is an internal combustion engine and the second prime mover is one of an electric motor-generator and a hydraulic motor-pump.

9. A transformer module for a dual prime mover powertrain system, comprising,
    a planetary gearset having a first rotary element configured for connection to a first prime mover, a second rotary element configured for connection to a second prime mover, and a third rotary element comprising an output member of the transformer module;
    at least one gear meshed with the second rotary element, the second prime mover connected to the second rotary element through the gear;
    a clutch for selectively inhibiting rotation of the second rotary element; and
    a power shunt between the first prime mover and the second prime mover, wherein the power that is transmitted through the power shunt between the first prime mover to the second prime mover is not transmitted through planet gear teeth of the planetary gearset while transmitted through the shunt, and wherein the first rotary element is a ring gear of the planetary gearset.

10. The transformer module of claim 9, wherein the power shunt includes a power generating device driven by the first prime mover and configured to provide power to the second prime mover during operation of the first prime mover.

11. The transformer module of claim 10, wherein the power generating device is connected to the first rotary element and driven by the first prime mover through the first rotary element.

12. The transformer module of claim 10, wherein the power generating device is an electrical generator.

13. The transformer module of claim 10, wherein the power generating device is a hydraulic pump.

14. The transformer module of claim 9, wherein the second rotary element is a sun gear and the third rotary element is a carrier that includes a number of pinion gears meshed with the ring gear and the sun gear.

* * * * *